(12) United States Patent
Ladubec, Jr.

(10) Patent No.: US 11,047,954 B2
(45) Date of Patent: Jun. 29, 2021

(54) INTELLIGENT PULSE JAM DETECTION FOR IDENTIFICATION FRIEND OR FOE (IFF) SYSTEMS

(71) Applicant: BAE Systems Information and Electronic Systems Integration Inc., Nashua, NH (US)

(72) Inventor: Peter Ladubec, Jr., Centereach, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 189 days.

(21) Appl. No.: 16/416,409

(22) Filed: May 20, 2019

(65) Prior Publication Data

US 2020/0371201 A1 Nov. 26, 2020

(51) Int. Cl.
| | |
|---|---|
| *G01S 7/36* | (2006.01) |
| *G01S 13/78* | (2006.01) |
| *H04K 3/00* | (2006.01) |
| *G01S 13/82* | (2006.01) |
| *G01S 13/76* | (2006.01) |

(52) U.S. Cl.
CPC .............. *G01S 7/36* (2013.01); *G01S 13/78* (2013.01); *H04K 3/22* (2013.01); *G01S 13/765* (2013.01); *G01S 13/825* (2013.01); *H04K 2203/10* (2013.01)

(58) Field of Classification Search
CPC .......... G01S 7/36; G01S 13/78; G01S 13/765; G01S 13/825

USPC ....................................................... 342/16, 45
See application file for complete search history.

(56) References Cited

U.S. PATENT DOCUMENTS

| | | | | |
|---|---|---|---|---|
| 4,213,128 | A * | 7/1980 | Longinotti ................ | G01S 7/36 342/19 |
| 5,379,043 | A * | 1/1995 | Bishop ...................... | G01S 7/36 342/159 |
| 5,426,434 | A * | 6/1995 | Bishop ...................... | G01S 7/36 342/13 |
| 5,572,214 | A * | 11/1996 | Ringel ................... | G01S 13/765 342/169 |
| 7,423,590 | B2 * | 9/2008 | Smith ..................... | G01S 19/20 340/686.1 |
| 7,773,027 | B2 * | 8/2010 | Tyree ..................... | F41G 7/226 342/83 |

(Continued)

*Primary Examiner* — Erin F Heard
*Assistant Examiner* — Michael W Justice
(74) *Attorney, Agent, or Firm* — Finch & Maloney PLLC; Scott J. Asmus

(57) ABSTRACT

Techniques are disclosed for determining the presence of pulse jams in an identification friend or foe (IFF) system. In an embodiment, a plurality of jamming pulse rates are determined. Each of the plurality of jamming pulse rates is a count of jamming pulses entering the IFF system during a corresponding integration period. Each of the plurality of jamming pulse rates is a count of jamming pulses associated with non-valid signals entering the IFF system. An average jamming pulse rate is computed based on the plurality of jamming pulse rates. The average jamming pulse rate is then compared against a pulse jam threshold to determine whether a pulse jam is present (or not present) in the IFF system.

25 Claims, 6 Drawing Sheets

(56) References Cited

U.S. PATENT DOCUMENTS

2007/0200761 A1* 8/2007 Smith .................... G01S 19/20
                                                          342/454
2010/0067608 A1* 3/2010 Tyree ................... F41G 7/2246
                                                          375/285

* cited by examiner

INTELLIGENT PULSE JAM DETECTION FOR IDENTIFICATION FRIEND OR FOE (IFF) SYSTEMS

FIELD OF THE DISCLOSURE

This disclosure relates generally to radar-based identification systems, and more particularly, to improved pulse jam detection for identification friend or foe (IFF) systems.

BACKGROUND

Identification friend or foe (IFF) is generally a radar-based system designed for command and control. IFF systems are used to detect and possibly identify aircraft or other objects located in a region of interest. IFF systems typically include an interrogator system and a complementary transponder system. In operation, a transponder system listens for interrogation signals (or challenges) transmitted by an interrogator system and responds to such signals by broadcasting or otherwise transmitting a response signal (or reply) that uniquely identifies the broadcaster of the response signal. For example, in a military application, IFF systems allow the interrogator system to identify an approaching aircraft or other object as friendly and to determine their bearing and range from the interrogator system. IFF systems used in civilian and military air traffic control allow for proper routing and situational awareness to reduce the chance of collision, for instance. However, there are a number of non-trivial issues associated with IFF systems.

Figure 1:
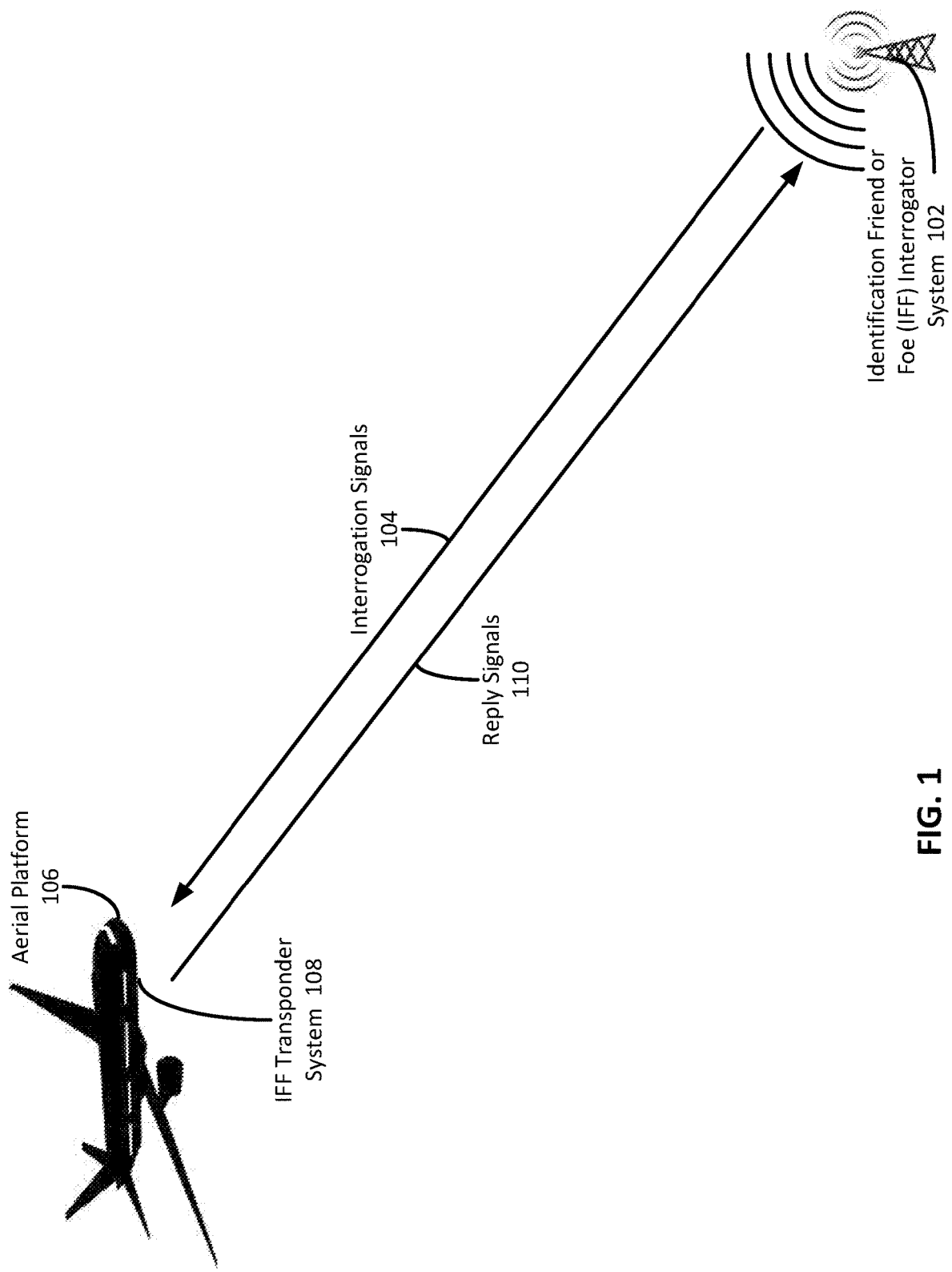
FIG. 1 is a schematic diagram of an example use case in which an identification friend or foe (IFF) interrogator system and an IFF transponder system are employed, in accordance with an embodiment of the present disclosure.

These and other features of the present embodiments will be understood better by reading the following detailed description, taken together with the figures herein described.

DETAILED DESCRIPTION

As mentioned above, there are a number of non-trivial issues associated with IFF systems. For example, IFF systems are susceptible to jamming, such as pulse jamming and spoofing, whether resulting from intentional or unintentional signals. Spoofing, in general, refers to another party taking advantage of the IFF as an imposter to obtain access or to provide false information, malware, and instructions. In general, jamming refers to the introduction of signals that interfere with the operation of the IFF system by saturating its receiver (such as the IFF interrogator system receiver or the IFF transponder system receiver) so that the IFF system is unable to perform its intended function. For example, in dense or crowded environments, such as near airports where large numbers of aircraft may be present, the sheer number of signals (e.g., reply signals) transmitted by the IFF transponder systems in the aircrafts may cause false pulse jam indications at the IFF interrogator system. Conversely, an IFF transponder system in an aircraft may be receiving a high volume of interrogation signals, which may result in false pulse jam indications at the IFF transponder system. In addition, in the case of a monopulse system where there is a sum antenna and a difference antenna, the sum antenna may pick up signals on the sum channel and the difference antenna may pick up signals on the delta channel. In such IFF systems, the signals received by the difference antenna on the delta channel may also cause an overload at the receiver coupled to the difference antenna. Current IFF systems detect pulse jams based only on the rate of pulses entering the IFF system and, based on the determined overall pulse rate, determine whether there is (or is not) a pulse jam. In response to detecting a pulse jam, the IFF system desensitizes its receiver and/or generates a pulse jam indication. Desensitizing the receiver reduces the effective detection range in the IFF interrogator system or the IFF transponder system, which causes the IFF system to possibly not detect targets that the IFF system should otherwise be detecting. However, in cases of crowded environments and/or use of difference antennas, the detected pulse jam may be a false pulse jam in that there is no interference with the operation of the receiver, and desensitizing the receiver in such cases may have been unnecessary and/or the generated pulse jam indication may be a false pulse jam indication.

Thus, and in accordance with an embodiment of the present disclosure, techniques are disclosed for detecting pulse jams in IFF systems based on the overall number of pulses entering the IFF system discounted by the number of real pulses associated with signals that are of the correct format. The overall number of pulses includes both the real pulses (which are pulses associated with signals of the correct format) and the jamming pulses (which are associated with signals that are not of the correct format). The real pulses are associated with valid signals, such as valid interrogation signals in the case of IFF transponder systems or valid reply signals in the case of IFF interrogator systems. The jamming pulses are associated with signals other than the valid signals, such as, for example, signals caused by interference, noise, or signals that include pulses intentionally designed to jam a communication system. In an IFF transponder system, a valid interrogator signal is of the correct format for an interrogator signal and thus can be processed to generate a valid decode of the interrogator signal. Similarly, in an IFF interrogator system, a valid reply signal is of the correct format for a reply signal and thus can be processed to generate a valid decode of the reply signal. In any case, a valid signal, such as a valid interrogator signal or a valid reply signal, is of the correct format and will generate or otherwise result in a valid decode of the signal that can be properly processed by the IFF system. Conversely, the non-valid signals are signals that are not of a format supported or otherwise understood by the IFF system (e.g., signals that include pulses intentionally designed to jam a communication system or any other pulses that are not part of a valid decode format.) For example, interference may occur as a result of a high volume of signals (e.g., interrogation signals or reply signals) overlapping, thus causing the IFF system to receive non-valid signals which it is unable to use. Such non-valid signals are of a format that cannot be properly decoded by the IFF system and thus, will not generate or otherwise result in a valid decode of the signal that can be properly processed by the IFF system. Using such discounted pulse rate (e.g., pulse rate resulting from the jamming pulses) to detect pulse jams results in a reduction in false pulse jam indications, thereby reducing the unnecessary desensitization of the receiver and/or generation of false pulse jam indications.

In more detail, and in accordance with an embodiment, a methodology to implement the pulse jam detection techniques disclosed herein includes determining an overall pulse rate. The overall pulse rate refers to a count of the overall number of pulses associated with all signals that are entering an IFF system per integration period. The method also includes determining a real pulse rate. The real pulse rate refers to a count of the number of real pulses associated with valid signals that are entering the IFF system per integration period. The method further includes subtracting (discounting) from the overall pulse rate the real pulse rate to determine a jamming pulse rate. The jamming pulse rate refers to a count of the number of jamming pulses associated with signals other than valid signals (e.g., any non-valid signals) that are entering the IFF system per integration period. The method further includes determining the presence of a pulse jam in the IFF system based on the jamming pulse rate. As opposed to using the overall pulse rate to determine the presence of a pulse jam, using the jamming pulse rate provides a more realistic sense of the pulse jamming environment that is present in the IFF system.

According to one such example embodiment, the overall pulse rate and the real pulse rate are collected and processed according to a pre-established integration rate. The integration rate specifies the rate at which the collected overall pulse rate and the real pulse rate are processed to determine whether there is (or is not) a pulse jam. The integration rate can be different based on the type of system (e.g., an IFF interrogator system or an IFF transponder system). For instance, in the case of an IFF interrogator system, the integration rate can vary depending on factors such as the range of the IFF interrogator system and the beam width of the antenna, to provide two examples. To provide an illustrative example, assuming that an IFF interrogator system has a pulse repetition interval (PRI) of four milliseconds (ms) to reach its maximum range, and the beam width of the antenna occupies 10 of these intervals (i.e., 10 PRI), an appropriate integration rate may be on the order of approximately 40 ms (i.e., 4 ms×10 PRI), such as on the order of 30 ms, 35 ms, 45 ms, 50 ms, or any other desired integration rate. In the case of an IFF transponder system, the integration rate can vary depending on factors such as the receive range of the IFF transponder system and anticipated interrogator environment, to provide two examples. Note that the number of interrogations expected to be received by the IFF transponder system may be based on the receive range of the IFF transponder system and the anticipated interrogator environment in which the IFF transponder system is to operate. To provide an illustrative example, assuming that an IFF transponder system has an interrogation rate of 100 interrogations per second, an appropriate integration rate may be on the order of approximately 10 ms (i.e., 1 second/100 interrogations), such as 7 ms, 8 ms, 9 ms, 11 ms, 12 ms, 13 ms, or any other desired integration rate. Numerous other factors may be utilized to determine the integration rate, and for this reason, specific examples of integration rates provided herein should not be construed as exhaustive or otherwise limiting. As will be appreciated in light of this disclosure, processing the collected overall pulse rate and the real pulse rate according to an integration rate allows for a more gradual update of the overall pulse jam environment that is present in the IFF system.

To provide an illustrative example of the collection and processing of the overall pulse rate and the real pulse rate according to a pre-established integration rate, suppose an integration rate of 20 ms is specified. An integration rate of 20 ms equates to an integration period of 0.02 seconds (i.e., $\frac{1}{20}$ ms) in duration. In a more general sense, an integration period is the reciprocal of the integration rate and defines a duration of time over which the pulses (e.g., the overall pulse rate and the real pulse rate) are counted. In this example, respective counters can be used to determine the overall pulse rate (a count of the overall number of pulses associated with all signals that are entering an IFF system) and the real pulse rate (a count of the number of real pulses associated with valid signals that are entering the IFF system) over a first integration period (e.g., from time T=0 to T=0.02 seconds). At the end of or subsequent to the conclusion of the first integration period, a jamming pulse rate for the first integration period can be determined by subtracting (discounting) the real pulse rate collected over the first integration period from the overall pulse rate collected over the first integration period. The computed jamming pulse rate can then be compared against a pre-established jamming pulse rate threshold to determine whether a pulse jam is present (or not present) during the first integration period. Note that the overall pulse rate and the real pulse rate continue to be collected beyond the first integration period. For example, according to a specific example embodiment, the respective counters are reset at the end of an integration period, such as at the end of the first integration period in this example, and the reset counters are used to determine the overall pulse rate and the real pulse rate over a second subsequent integration period (e.g., from time T=0.02 to T=0.04 seconds). At the end of or subsequent to the conclusion of the second integration period, the overall pulse rate and the real pulse rate collected over the second integration period can then be used to determine a jamming pulse rate for the second integration period, and this jamming pulse rate can be compared against the pre-established jamming pulse rate threshold to determine whether a pulse jam is present (or not present) during the second integration period. Note that this cycle (i.e., continued collection of the data over subsequent integration periods (e.g., from time T=0.04 to T=0.06 seconds, T=0.06 to T=0.08 seconds, and so on) and the use of the collected data to determine the presence or non-presence of a pulse jam during the subsequent integration periods) can be iterated in a pipeline fashion any number of times. This allows for making a determination as to whether a pulse jam is present (or not present) in the IFF system based on the results of multiple comparisons to the jamming pulse rate threshold, wherein the comparisons are periodically performed at the specified integration rate.

To this end, and in accordance with an example embodiment, an incremental accumulator can be used to maintain a running total or count of the number of integration periods in which a pulse jam is present and the number of integration periods in which a pulse jam is not present. In some such embodiments, the incremental accumulator is initialized to zero (0), and at the end of or subsequent to a particular integration period, the incremental accumulator is updated based on the comparison of the count of the jamming pulses that entered the IFF system during the particular integration period (i.e., the jamming pulse rate for the particular integration pulse rate) and the jamming pulse rate threshold. In particular, and in one implementation, the incremental accumulator is either incremented by one (+1) if the count of the number of jamming pulses that entered the IFF system during the particular integration period exceeds the jamming pulse rate threshold, decremented by one (−1) if the count of the number of jamming pulses that entered the IFF system during the particular integration period does not exceed the jamming pulse rate threshold, or remains unchanged (+0) if the count of the number of jamming pulses that entered the IFF system during the particular integration period is equal to the jamming pulse rate threshold. The constants used by the incremental accumulator (+1, −1, 0) may be changed to any other values depending on the application. The value of the incremental accumulator can then be used to determine whether a pulse jam is present (or not present) in the IFF system. For example, the IFF system can determine that a pulse jam is present if the incremental accumulator exceeds a pre-established pulse jam threshold. In short, using the incremental accumulator in this manner provides for "smoothing" or averaging of the discrete jamming pulse rates over multiple integration periods.

The disclosed techniques provide numerous advantages over previous techniques for determining pulse jams in IFF systems. For example, and according to an embodiment, the techniques determine the presence of a pulse jam in an IFF system based on the rate of jamming pulses entering the IFF system. Thus, unlike previous techniques that use the overall pulse rate as a discriminate to determine the presence of a pulse jam, an IFF interrogator system or an IFF transponder system according to an embodiment of the present disclosure determines the presence of a pulse jam based on jamming pulse rates. This provides a reduction in false pulse jam indications to users or operators of the IFF interrogator system or the IFF transponder system. Also, as will be further appreciated in light of this disclosure, determining pulse jams based on the rate of jamming pulses provides increased detection range of the IFF interrogator system or the IFF transponder system and reduces or alleviates the detrimental effects of receiver desensitization. In addition, the disclosed techniques, according to some embodiments, allows for control of integration rates and thresholds, such as the jamming pulse rate threshold and/or the pulse jam threshold, thus making such techniques adaptable for operation in varying platforms and/or environments. Moreover, the disclosed pulse jam detection technique can be implemented in a relatively efficient manner by, for example, modifying existing IFF interrogator systems or IFF transponder systems, and reusing or otherwise leveraging the hardware and components of such existing IFF interrogator systems or IFF transponder systems. For example, in some embodiments, IFF signal processing and pulse reconstruction may be performed by processors and circuits of existing IFF interrogator systems or IFF transponder systems such that no additional sensor or electronics unit is required to decode the signals and detect the pulses entering such systems, making this a cost-effective solution. In such cases, firmware or software upgrades can be made to utilize the existing hardware and components of existing IFF systems as variously described herein. By way of an example, any number of non-transitory machine-readable mediums (e.g., embedded memory, on-chip memory, read only memory, random access memory, solid state drives, and any other physical storage mediums) can be used to encode the instructions that, when executed by one or more processors, cause the techniques provided herein to be carried out. These and other advantages and alternative embodiments will be apparent in light of this disclosure.

System Architecture

FIG. 1 is a schematic diagram of an example use case in which an identification friend or foe (IFF) interrogator system 102 and an IFF transponder system 104 are employed, in accordance with an embodiment of the present disclosure. As shown, and in this example use case, IFF interrogator system 102 is configured and operable to interrogate a region of interest in search of complementary IFF transponder system 104 onboard or otherwise integrated with an aerial platform 106 (e.g., IFF transponders of friendly forces) located in the region of interest. To do so, IFF interrogator system 102 transmits or otherwise sends interrogation signals 104 (requests or challenges) for receipt by complementary IFF transponder system 108 (such as those described in the present disclosure) onboard aerial platform 106. IFF transponder system 108 receives interrogating signals 104 and transmits or otherwise responds with reply signals 110. Correct or appropriate reply signals 110 can allow IFF interrogator system 102 to determine the identity of aerial platform 106, and possibly determine that aerial platform 106 is friendly. The depiction of IFF interrogator system 102 as a ground facility or platform and aerial platform 106 as an aircraft is merely for explaining the operations in one example. The IFF interrogator system can be ground based, maritime based, air based, or space based. Likewise, the platform equipped with the IFF transponder system can be ground based, maritime based, air based, or space based.

In further detail, interrogation signals 104 can contain numerous electronic challenges, for which IFF transponder system 108 receiving such interrogation signals 104 responds appropriately via reply signals 110. If IFF transponder system 108 responds appropriately, IFF interrogator system 102 can determine that aerial platform 106 is a friendly aircraft (along with other possible identifying information, such as the type of aircraft, nation of allegiance, serial or other identification number, location or position information, and the like). Interrogation signals 104 and reply signals 110 may conform to existing or future message formats including, for example, Selective Identification Feature (SIF), Mode S, Mode 4, and Mode 5. Interrogation signals 104 and reply signals 110 can be encoded and modulated in multiple ways, such as minimum-shift keying (MSK) modulation (such as in pulses each having numerous bits encoded using MSK modulation) and digital signal modulation (e.g., pulses including rising and falling edges having corresponding rise and fall times), to provide two examples. For example, and in one embodiment, interrogation signals 104 and reply signals 110 may be encoded for modulation as electromagnetic radiation, such as modulated 1030 megahertz (MHz) waveforms for interrogation signals 104 and modulated 1090 MHz waveforms for reply signals 110. In addition, in certain modes, such as Mode 4 and Mode 5, for instance, the challenges and replies can be encrypted (e.g., through a cryptographic technique on the bits that undergo MSK modulation) using a cryptographic key prior to encoding and transmission to IFF transponder system 108 or back to IFF interrogator system 102. As used herein, encryption refers to altering data in a reversible manner to make the data unintelligible to eavesdroppers lacking the cryptographic key and technique to decrypt the encrypted data. In some embodiments, reply signals received by IFF interrogator system 102 may be unsolicited (e.g., not transmitted in response to an interrogation). Such unsolicited reply signals may be, for example, Mode 5 or Mode S squitters.

Figure 2:
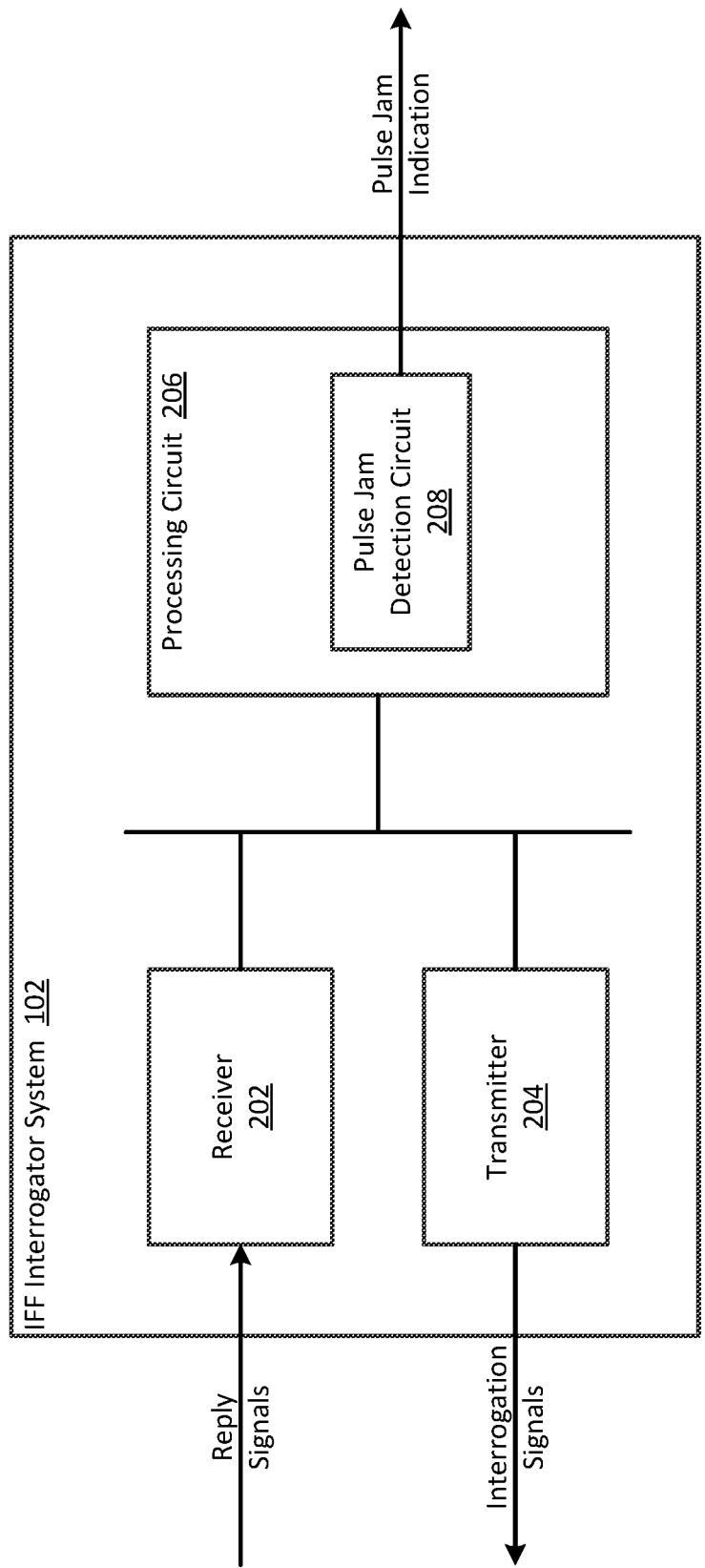
FIG. 2 is a block diagram illustrating selected components of an example IFF interrogator system, such as the IFF interrogator system of FIG. 1, in accordance with an embodiment of the present disclosure.

FIG. 2 is a block diagram illustrating selected components of an example IFF interrogator system, such as IFF interrogator system 102 of FIG. 1, in accordance with an embodiment of the present disclosure. As shown, IFF interrogator system 102 includes a receiver 202, a transmitter 204, and a processing circuit 206. Receiver 202, transmitter 204, and processing circuit 206 may be communicatively coupled to one or more of the other. In various embodiments, additional components (not illustrated, such as a processor, one or more antennas, power supply, etc.) or a subset of the illustrated components can be employed without deviating from the scope of the present disclosure. For instance, in various embodiments, IFF interrogator system 102 may not include one or more of the components illustrated in FIG. 2, but IFF interrogator system 102 may connect or otherwise couple to the one or more components via interface circuitry. Other embodiments may integrate the various functionalities of the illustrated components into fewer components or more components. For example, some or all of the functionality and/or components of transmitter 204 may be integrated into and/or performed by receiver 202. In a more general sense, the degree of integration and distribution of the functional component(s) provided herein can vary greatly from one embodiment to the next, and this disclosure should not be construed as limited in this regard.

Receiver 202 is configured to receive incoming signals through an antenna (not shown). In some embodiments, receiver 202 is configured to receive modulated signals, such as radar signals, in a pre-established frequency band or channel, such as the L-band of the RF frequency spectrum (e.g., 500 MHz to 1500 MHz) and, in a specific embodiment, in the 1090 MHz channel. In some such embodiments, receiver 202 may include a low-noise amplifier, matched filter, and demodulator to demodulate the received signals. The received signals may include IFF reply signals transmitted by complementary IFF transponder systems as well as other, spurious signals in the pre-established frequency band. In an example use case, for instance, IFF interrogator system 102 may utilize an antenna, such as a rotating or stationary antenna, and send IFF interrogation signals according to an interrogation rate. As a result, aerial platforms equipped with complementary IFF transponder systems and that are flying through the antenna beam may receive the IFF interrogation signals (challenges) and, for each challenge received, the IFF transponder system onboard the aerial platform may send back a reply (an IFF reply signal) modulated on a 1090 MHz carrier wave. Receiver 202 can then receive the modulated signals, including the modulated reply signals, as electromagnetic waves and convert them to encoded signals or pulse patterns. These signals can be waveforms that convey information, such as encoded IFF replies, whose corresponding data may conform to a message format such as, for example, SIF, Mode S, Mode 4, and Mode 5. In some embodiments, the data (e.g., encoded IFF replies) may be encrypted, such as in the case of Mode 4 or Mode 5, for instance.

Transmitter 204 is configured to transmit signals through an antenna (not shown), such as a rotating or stationary antenna, for example. In some embodiments, transmitter 204 is configured to transmit modulated signals, such as radar signals, in a pre-established frequency band or channel, such as the L-band of the RF frequency spectrum (e.g., 500 MHz to 1500 MHz) and, in a specific embodiment, in the 1030 MHz channel. In some such embodiments, transmitter 204 may include RF components such as amplifiers, filters, and the like. In some embodiments, transmitter 204 is configured to transmit RF broadcast signals to be received by complementary IFF transponder systems. For example, and according to an embodiment, transmitter 204 can receive encoded IFF challenges from processing circuit 206, for instance. In response, transmitter 204 can modulate the encoded IFF challenges on a 1030 MHz carrier wave, amplify the modulated signals, and transmit the resulting IFF interrogation signals over an antenna, such as a rotating or stationary antenna, for receipt by complementary IFF transponder systems. In some embodiments, however, the encoded IFF challenges may be encrypted to prevent eavesdropping by unintended recipients in certain applications where security may be a consideration.

Processing circuit 206 is configured to determine a region of interest to search for complementary IFF transponder systems, such as IFF transponder system 108. In some such embodiments, processing circuit 204 can operate transmitter 204 to broadcast pre-established IFF interrogation signals for receipt by complementary IFF transponder systems 108 that are in the region of interest. For example, and in one embodiment, processing circuit 206 can prepare encoded IFF challenges, and send the encoded challenges to transmitter 204 for transmitting. In some such embodiments, processing circuit 206 can determine an interrogation rate, and send the encoded IFF challenges to transmitter 204 according to the interrogation rate. The encoded IFF challenges may include data that conforms to a message format such as, for example, SIF, Mode S, Mode 4, and Mode 5. In some embodiments, the data (e.g., encoded IFF challenges) may be encrypted, such as in the case of Mode 4 or Mode 5, for instance.

Processing circuit 206 is also configured to process the signals received by receiver 202. In particular, processing circuit 206 can process the signals to identify and/or determine whether the signals correspond to valid IFF reply signals, such as IFF reply signals that are replies to broadcast IFF challenges. In a specific embodiment, processing circuit 206 includes pulse reconstruction logic that reconstructs (e.g., recreates) the pulses of the signals received by receiver 202. For example, in one embodiment, the pulses of the signals can be reconstructed utilizing digital signal processing. Processing circuit 206 can then process or otherwise use the reconstructed pulses to determine whether the reconstructed pulses correspond to pulses of valid IFF reply signals as opposed to non-valid signals (e.g., signals from interference, noise, etc.) If the reconstructed pulses correspond to valid IFF reply signals, processing circuit 206 can process the replies contained in the IFF reply signals. For instance, processing circuit 206 may process the replies to determine the identities, altitudes, and/or position of the senders (e.g., aerial platforms) of the IFF reply signals.

In some embodiments, the pulse reconstruction logic of processing circuit 206 can generate a pulse indication for each reconstructed pulse. A pulse indication indicates that a pulse of the received signal has been reconstructed. Here, pulse indications are generated without regard to whether the reconstructed pulses correspond to real pulses (e.g., pulses of valid IFF reply signals) or jamming pulses (e.g., pulses from non-valid signals). As such, the pulse indications generated by the pulse reconstructed logic provide an indication of all the pulses of all the signals that are being received by receiver 202.

In some embodiments, processing circuit 206 includes dedicated pulse validation logic that determines whether the reconstructed pulses correspond to real pulses (pulses of valid IFF reply signals). For example, in one embodiment, processing circuit 206 can include a SIF pulse validation logic, a Mode S pulse validation logic, a Mode 4 pulse validation logic, and a Mode 5 pulse validation logic. In such embodiments, the SIF pulse validation logic can determine whether one or more reconstructed pulses corresponds to corresponding one or more pulses of an IFF SIF reply signal and, for the one or more validated pulses, generate a valid SIF indication that indicates a valid (successful) decode of the reconstructed one or more pulses as an IFF SIF reply. Similarly, the Mode S pulse validation logic can determine whether one or more reconstructed pulses corresponds to corresponding one or more pulses of an IFF Mode S reply signal and, for the one or more validated pulses, generate a valid Mode S indication that indicates a valid (successful) decode of the reconstructed one or more pulses as an IFF Mode S reply; the Mode 4 pulse validation logic can determine whether one or more reconstructed pulses corresponds to corresponding one or more pulses of an IFF Mode 4 reply signal and, for the one or more validated pulses, generate a valid Mode 4 indication that indicates a valid (successful) decode of the reconstructed one or more pulses as an IFF Mode 4 reply; and the Mode 5 pulse validation logic can determine whether one or more reconstructed pulses corresponds to corresponding one or more pulses of an IFF Mode 5 reply signal and, for the one or more validated pulses, generate a valid Mode 5 indication that indicates a valid (successful) decode of the reconstructed one or more pulses as an IFF Mode 5 reply.

As can be seen in FIG. 2, processing circuit 206 includes a pulse jam detection circuit 208. In one example, pulse jam detection circuit 208 is configured to determine the presence of a pulse jam based on the overall number of pulses entering IFF interrogator system 102 discounted by the number of real pulses that are of the correct format. Here, the real pulses are pulses that correspond to valid IFF reply signals, and the overall number of pulses includes both the real pulses and the jamming pulses, which are pulses that correspond to signals that are not of the correct format for valid IFF reply signals. Note that the number of pulses entering IFF interrogator system 102 can be determined from the pulse indications generated by the pulse reconstruction logic of processing circuit 206. Further note that the number of real pulses can be determined from the pulse indication generated by the dedicated pulse validation logic of processing circuit 206. Pulse jam detection circuit 208 will be described in further detail with respect to FIG. 4.

As previously noted, in the case of a monopulse system, a sum antenna may pick up signals on the sum channel and a difference antenna may pick up signals on the delta channel. Here, the signals received by the difference antenna on the delta channel may also cause an overload at the receiver coupled to the difference antenna. For example, and in one implementation, IFF interrogator system 102 can utilize a monopulse system with either a stationary antenna or a rotating antenna to receive incoming signals on both the sum channel and the delta channel. In such example implementations, a first receiver 202 may be coupled to the sum antenna and a second receiver 202 may be coupled to the difference antenna. In such cases, the first receiver 202 has a dedicated pulse jam detection circuit 208 for processing the signals received by the sum antenna for pulse jams, and the second receiver 202 has a dedicated pulse jam detection circuit 208 for processing the signals received by the difference antenna for pulse jams. That is, there is a dedicated pulse jam detection circuit 208 for processing signals received on the sum channel, and another dedicated pulse jam detection circuit 208 for processing signals received on the difference channel. In contrast to a monopulse system, a rotating system includes a sum antenna for the sum channel and may include a difference antenna. In the case where a rotating system is utilized to receive incoming signals, a single receiver 202 may be coupled to a sum antenna to receive the signals on the sum channel. In this case, a single pulse jam detection circuit 208 may be used to process the signals received by the sum antenna for pulse jams.

Figure 3:
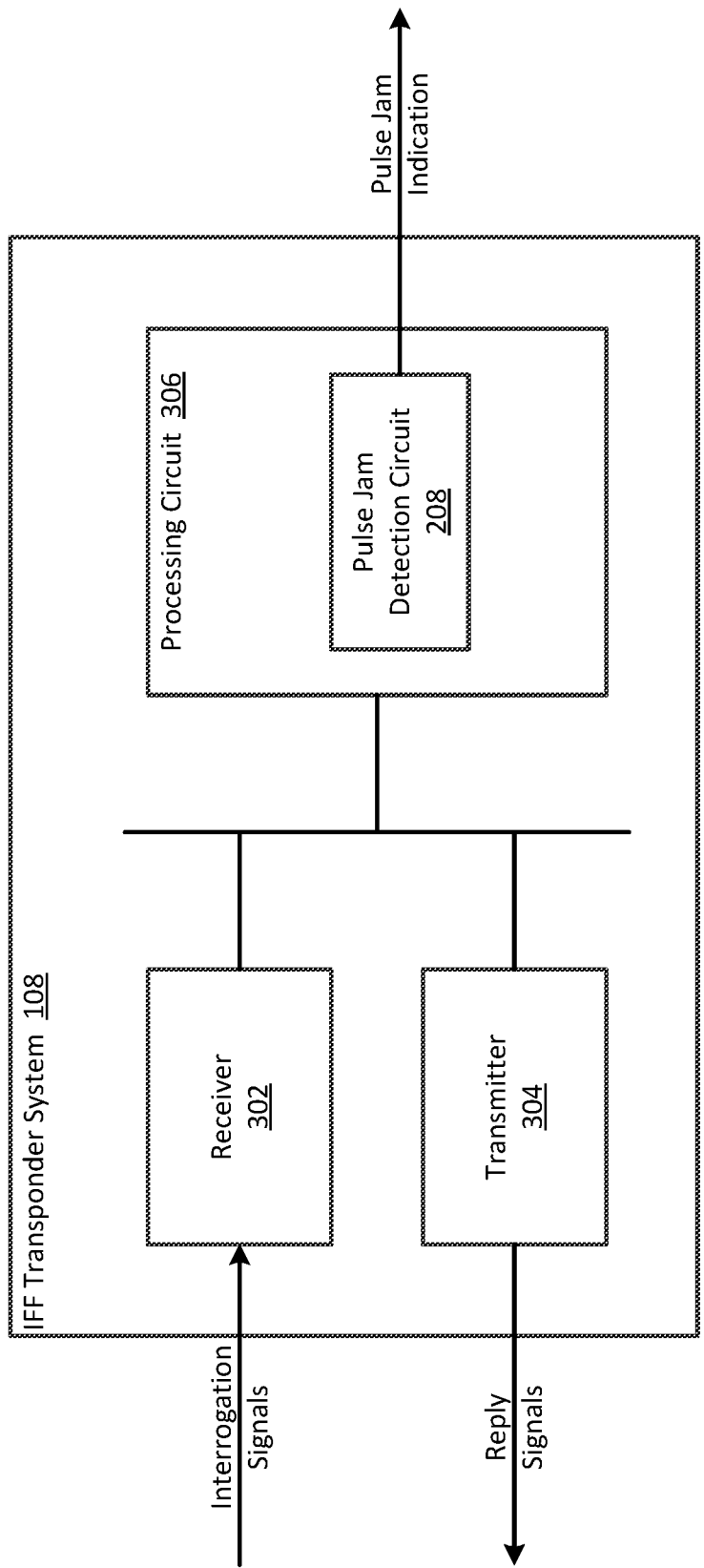
FIG. 3 is a block diagram illustrating selected components of an example IFF transponder system, such as the IFF transponder system of FIG. 1, in accordance with an embodiment of the present disclosure.

FIG. 3 is a block diagram illustrating selected components of an example IFF transponder system, such as IFF transponder system 108 of FIG. 1, in accordance with an embodiment of the present disclosure. As shown, IFF transponder system 108 includes a receiver 302, a transmitter 304, and a processing circuit 306. Receiver 302, transmitter 304, and processing circuit 306 may be communicatively coupled to one or more of the other. In various embodiments, additional components (not illustrated, such as a processor, one or more antennas, power supply, etc.) or a subset of the illustrated components can be employed without deviating from the scope of the present disclosure. For instance, in various embodiments, IFF transponder system 108 may not include one or more of the components illustrated in FIG. 3, but IFF transponder system 108 may connect or otherwise couple to the one or more components via interface circuitry. Other embodiments may integrate the various functionalities of the illustrated components into fewer components or more components. For example, some or all of the functionality and/or components of transmitter 304 may be integrated into and/or performed by receiver 302. In a more general sense, the degree of integration and distribution of the functional component(s) provided herein can vary greatly from one embodiment to the next, and this disclosure should not be construed as limited in this regard.

Receiver 302 is configured to receive incoming signals through an antenna (not shown). In some embodiments, receiver 302 is configured to receive modulated signals, such as radar signals, in a pre-established frequency band or channel, such as the L-band of the RF frequency spectrum (e.g., 500 MHz to 1500 MHz) and, in a specific embodiment, in the 1030 MHz channel. In some such embodiments, receiver 302 may include a low-noise amplifier, matched filter, and demodulator to demodulate the received signals. The received signals may include IFF interrogation signals transmitted by IFF interrogator systems as well as other, spurious signals in the pre-established frequency band. For example, receiver 302 can receive modulated signals, including modulated IFF interrogation signals, as electromagnetic waves and convert them to encoded signals or pulse patterns. These signals can be waveforms that convey information, such as encoded IFF challenges, whose corresponding data may conform to a message format such as, for example, SIF, Mode S, Mode 4, and Mode 5. In some embodiments, the data (e.g., encoded IFF challenges) may be encrypted, such as in the case of Mode 4 or Mode 5, for instance.

Transmitter 304 is configured to transmit signals through an antenna (not shown). In some embodiments, transmitter 304 is configured to transmit modulated signals, such as radar signals, in a pre-established frequency band or channel, such as the L-band of the RF frequency spectrum (e.g., 500 MHz to 1500 MHz) and, in a specific embodiment, in the 1090 MHz channel. In some such embodiments, transmitter 304 may include RF components such as amplifiers, filters, and the like. In some embodiments, transmitter 304 is configured to transmit IFF reply signals to be received by an IFF interrogator system. For example, and according to an embodiment, transmitter 304 can receive encoded IFF replies from processing circuit 306, for instance. The encoded IFF replies may be replies to IFF challenges received by receiver 302. In response, transmitter 304 can modulate the encoded IFF replies on a 1090 MHz carrier wave, amplify the modulated signals, and transmit the resulting IFF reply signals over an antenna for receipt by an IFF interrogator system (e.g., the IFF interrogator system that sent the IFF interrogations to which the IFF reply signals are replying). In some embodiments, however, the encoded IFF replies may be encrypted to prevent eavesdropping by unintended recipients in certain applications where security may be a consideration.

Processing circuit 306 is configured to process the signals received by receiver 302. In particular, processing circuit 306 can processes the signals to identify and/or determine whether the signals correspond to valid IFF interrogation signals. For example, and according to an embodiment, processing circuit 306 includes pulse reconstruction logic to reconstruct (e.g., recreate) the pulses of the signals utilizing digital signal processing, and processes the reconstructed pulses to determine whether they correspond to valid IFF interrogation signals as opposed to non-valid signals. If the reconstructed pulses correspond to valid IFF interrogation signals, processing circuit 306 can process the IFF challenges contained in the IFF interrogation signals. For instance, in an embodiment, processing circuit 306 can generate or otherwise prepare corresponding IFF replies to the IFF challenges, encode the IFF replies, and send the encoded IFF replies to transmitter 304. The encoded IFF replies may include data that conforms to a message format such as, for example, SIF, Mode S, Mode 4, and Mode 5. By way of one example, in the case of an IFF SIF challenge, the encoded IFF reply includes data that conforms to the SIF message format. In some embodiments, the data (e.g., encoded IFF replies) may be encrypted, such as in the case of Mode 4 or Mode 5, for instance. In such embodiments, processing circuit 306 can encrypt the IFF replies, encode the encrypted IFF replies, and send the encoded encrypted IFF replies to transmitter 304.

In some embodiments, the pulse reconstruction logic of processing circuit 306 can also generate a pulse indication for each reconstructed pulse. A pulse indication indicates that a pulse of the received signal has been reconstructed. Here, pulse indications are generated without regard to whether the reconstructed pulses correspond to real pulses (e.g., pulses of valid IFF interrogation signals) or jamming pulses (e.g., pulses of non-valid signals). As such, the pulse indications generated by the pulse reconstructed logic provide an indication of all the pulses of all the signals that are being received by receiver 302.

In some embodiments, processing circuit 306 includes dedicated pulse validation logic that determines whether the reconstructed pulses correspond to real pulses (pulses of valid IFF interrogation signals). For example, in one embodiment, processing circuit 306 can include a SIF pulse validation logic, a Mode S pulse validation logic, a Mode 4 pulse validation logic, and a Mode 5 pulse validation logic. In such embodiments, the SIF pulse validation logic can determine whether reconstructed one or more pulses corresponds to one or more pulses of an IFF SIF interrogation signal and, for the validated one or more pulses, generate a valid SIF indication that indicates a valid (successful) decode of the reconstructed one or more pulses as an IFF SIF challenge. Similarly, the Mode S pulse validation logic can determine whether one or more reconstructed pulses corresponds to one or more pulses of an IFF Mode S interrogation signal and, for the validated one or more pulses, generate a valid Mode S indication that indicates a valid (successful) decode of the reconstructed one or more pulses as an IFF Mode S challenge; the Mode 4 pulse validation logic can determine whether one or more reconstructed pulses corresponds to one or more pulses of an IFF Mode 4 interrogation signal and, for the validated one or more pulses, generate a valid Mode 4 indication that indicates a valid (successful) decode of the reconstructed one or more pulses as an IFF Mode 4 challenge; and the Mode 5 pulse validation logic can determine whether one or more reconstructed pulses corresponds to one or more pulses of an IFF Mode 5 interrogation signal and, for the validated one or more pulses, generate a valid Mode 5 indication that indicates a valid (successful) decode of the reconstructed one or more pulses as an IFF Mode 5 challenge.

As can be seen in FIG. 3, processing circuit 306 includes a pulse jam detection circuit 208. As described previously, pulse jam detection circuit 208 is configured to determine the presence of a pulse jam based on the overall number of pulses discounted by the number of real pulses that are of the correct format. In this case where pulse jam detection circuit 208 is included in processing circuit 306, pulse jam detection circuit 208 is configured to detect pulse jams based on the overall number of pulses (both the real pulses and the jamming pulses, which are pulses that correspond to signals that are not of the correct format for valid IFF interrogation signals) entering IFF transponder system 108 discounted by the number of real pulses that are of the correct format (pulses that correspond to valid IFF interrogation signals). Note that the number of pulses entering IFF transponder system 108 can be determined from the pulse indications generated by the pulse reconstruction logic of processing circuit 306. Further note that the number of real pulses can be determined from the pulse indication generated by the dedicated pulse validation logic of processing circuit 306. Pulse jam detection circuit 208 will be described in further detail with respect to FIG. 4. Note that the previous relevant discussion with respect to monopulse systems, including the need for a dedicated pulse jam detection circuit 208 for processing signals received on the sum channel and another dedicated pulse jam detection circuit 208 for processing signals received on the difference channel is equally applicable here.

Figure 4:
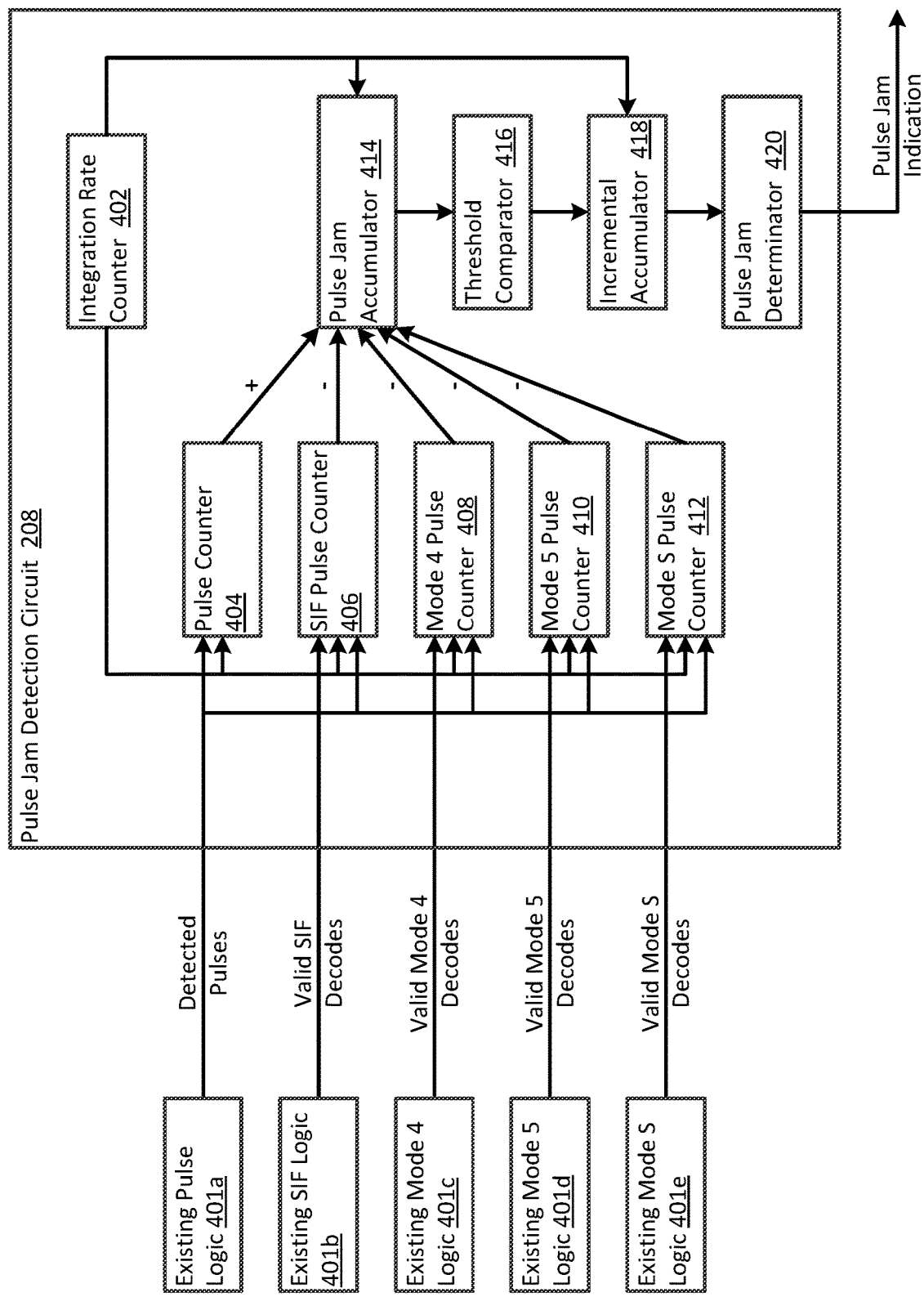
FIG. 4 is a block diagram illustrating selected components of an example pulse jam detection circuit 208 that may be implemented as part of the IFF interrogator system of FIG. 2 or the IFF transponder system of FIG. 3, in accordance with an embodiment of the present disclosure.

FIG. 4 is a block diagram illustrating selected components of an example pulse jam detection circuit 208 that may be implemented as part of IFF interrogator system 102 of FIG. 2 or IFF transponder system 108 of FIG. 3, in accordance with an embodiment of the present disclosure. As noted above, in some embodiments, pulse jam detection circuit 208 may be implemented as part of processing circuit 206 of IFF interrogator system 102 or as part of processing circuit 306 of IFF transponder system 108. As shown, pulse jam detection circuit 208 includes an integration rate counter 402, a pulse counter 404, an SIF pulse counter 406, a Mode 4 pulse counter 408, a Mode 5 pulse counter 410, a Mode S pulse counter 412, a jam pulse accumulator 414, a threshold comparator 416, an incremental accumulator 418, and a pulse jam determinator 420. According to some embodiments, pulse jam detection circuit 208 receives the detected pulses from existing pulse logic circuit 401*a* as well as valid decoded pulse indications for various valid pulse types (e.g., SIF, Mode 4, Mode 5, Mode S) from corresponding existing logic circuits 401*b*-401*e*. Each of pulse logic circuit 401*a*, existing SIF logic circuit 401b, existing Mode 4 logic circuit 401c, existing Mode 5 logic circuit 401d, and existing Mode S logic circuit 401e may be implemented in the pulse reconstruction logic component of the processing circuit (e.g., processing circuit 206 in the case of IFF interrogator system 102 or processing circuit 306 in the case of IFF transponder system 108)

In some embodiments, pulse jam detection circuit 208 is configured to determine the presence of a pulse jam based on data collected according to a pre-established integration rate. The data includes an overall pulse rate and a real pulse rate, wherein the overall pulse rate and the real pulse rate are processed at the end of or subsequent to the conclusion of each integration period to determine whether a pulse jam is present (or not present) during the integration period over which the data is collected. As explained above, an overall pulse rate is a count of the overall number of pulses that entered the IFF system during an integration period, and a real pulse rate is a count of the real pulses that entered the IFF system during an integration period.

Integration rate counter 402 is configured to maintain a count of the pre-established integration rate and, according to the integration rate, provide signals to various components of pulse jam detection circuit 208 that indicate the end or completion of an integration period. In particular, and in one implementation, integration rate counter 402 can measure the integration periods and, at the end of each integration period, send the counters (e.g., pulse counter 404, SIF pulse counter 406, Mode 4 pulse counter 408, Mode 5 pulse counter 410, and Mode S pulse counter 412) a reset signal to indicate the end or completion of an integration period. Integration rate counter 402 can also send an integration period completion signal to jam pulse accumulator 414 and incremental accumulator 418 to indicate the end or completion of an integration period. In some embodiments, the integration rate can be tuned or adjusted in real-time based on the operating characteristics of the IFF system. To this end, in the case of an IFF transponder system, software can be implemented to monitor the number of challenges received by the IFF transponder system over a suitable period of time (e.g., 1 second, 1.25 seconds, 1.5 seconds, etc.) and dynamically tune or adjust the integration rate accordingly. In the case of an IFF interrogator system, software can be implemented to monitor the number of replies received by the IFF interrogator system over a suitable period of time (e.g., 0.75 seconds, 1 second, 1.25 seconds, 1.5 seconds, etc.) and dynamically tune or adjust the integration rate accordingly. The dynamic tuning of the integration rate may cause subsequent integration periods to be of different time durations (e.g., a first integration period may be 0.02 seconds in duration and a subsequent second integration period may be 0.025 seconds in duration).

Pulse counter 404 is configured to determine an overall pulse rate. The overall pulse rate is a measure of the overall number of pulses that are entering the IFF system per integration period. In one embodiment, pulse counter 404 receives the pulse indications generated by existing pulse logic 401a and determines the overall pulse rate by counting the number of pulse indications. As described previously, a pulse indication is generated for each reconstructed real pulse or reconstructed jamming pulse. Thus, the pulse indications provide a measure of the pulses of all signals that are being received by the receiver (e.g., receiver 202 in the case of IFF interrogator system 102 or receiver 302 in the case of IFF transponder system 108) of the IFF system. Pulse counter 404 is also configured to provide the current counter value (i.e., overall pulse rate for the current integration period) to pulse jam accumulator 414 in response to receiving a reset signal from integration rate counter 402, and to reset itself (e.g., initialize the count to 0) subsequent to providing the current counter value to pulse jam accumulator 414. Resetting in this manner allows pulse counter 404 to determine the overall pulse rate for the subsequent integration period.

SIF pulse counter 406 is configured to determine a SIF pulse rate. The SIF pulse rate is a measure of the number of pulses that are associated with IFF SIF signals that are entering the IFF system per integration period. In one embodiment, SIF pulse counter 406 receives the SIF pulse indications generated by existing SIF logic 401b and determines the SIF pulse rate by counting the number of SIF pulse indications. As described previously, an SIF pulse indication is generated for each reconstructed pulse validated as being a pulse of an IFF SIF signal. Thus, the SIF pulse indications provide a measure of the valid SIF decodes of signals received by the receiver (e.g., receiver 202 in the case of IFF interrogator system 102 or receiver 302 in the case of IFF transponder system 108) of the IFF system. SIF pulse counter 406 is also configured to provide the current counter value (i.e., SIF pulse rate for the current integration period) to pulse jam accumulator 414 in response to receiving a reset signal from integration rate counter 402, and to reset itself (e.g., initialize the count to 0) subsequent to providing the current counter value to pulse jam accumulator 414. Resetting in this manner allows SIF pulse counter 406 to determine the SIF pulse rate for the subsequent integration period.

Mode 4 pulse counter 408 is configured to determine a Mode 4 pulse rate. The Mode 4 pulse rate is a measure of the number of pulses that are associated with IFF Mode 4 signals that are entering the IFF system per integration period. In one embodiment, Mode 4 pulse counter 408 receives the Mode 4 pulse indications generated by existing Mode 4 logic 401c and determines the Mode 4 pulse rate by counting the number of Mode 4 pulse indications. As described previously, a Mode 4 pulse indication is generated for each reconstructed pulse validated as being a pulse of an IFF Mode 4 signal. Thus, the Mode 4 pulse indications provide a measure of the valid Mode 4 decodes of signals received by the receiver (e.g., receiver 202 in the case of IFF interrogator system 102 or receiver 302 in the case of IFF transponder system 108) of the IFF system. Mode 4 pulse counter 408 is also configured to provide the current counter value (i.e., Mode 4 pulse rate for the current integration period) to pulse jam accumulator 414 in response to receiving a reset signal from integration rate counter 402, and to reset itself (e.g., initialize the count to 0) subsequent to providing the current counter value to pulse jam accumulator 414. Resetting in this manner allows Mode 4 pulse counter 408 to determine the Mode 4 pulse rate for the subsequent integration period.

Mode 5 pulse counter 410 is configured to determine a Mode 5 pulse rate. The Mode 5 pulse rate is a measure of the number of pulses that are associated with IFF Mode 5 signals that are entering the IFF system per integration period. In one embodiment, Mode 5 pulse counter 410 receives the Mode 5 pulse indications generated by existing Mode 5 logic 401d and determines the Mode 5 pulse rate by counting the number of Mode 5 pulse indications. As described previously, a Mode 5 pulse indication is generated for each reconstructed pulse validated as being a pulse of an IFF Mode 5 signal. Thus, the Mode 5 pulse indications provide a measure of the valid Mode 5 decodes of signals received by the receiver (e.g., receiver 202 in the case of IFF interrogator system 102 or receiver 302 in the case of IFF transponder system 108) of the IFF system. Mode 5 pulse counter 410 is also configured to provide the current counter value (i.e., Mode 5 pulse rate for the current integration period) to pulse jam accumulator 414 in response to receiving a reset signal from integration rate counter 402, and to reset itself (e.g., initialize the count to 0) subsequent to providing the current counter value to pulse jam accumulator 414. Resetting in this manner allows Mode 5 pulse counter 410 to determine the Mode 5 pulse rate for the subsequent integration period.

Mode S pulse counter 412 is configured to determine a Mode S pulse rate. The Mode S pulse rate is a measure of the number of pulses that are associated with IFF Mode S signals that are entering the IFF system per integration period. In one embodiment, Mode S pulse counter 412 receives the Mode S pulse indications generated by existing Mode S logic 401e and determines the Mode S pulse rate by counting the number of Mode S pulse indications. As described previously, a Mode S pulse indication is generated for each reconstructed pulse validated as being a pulse of an IFF Mode S signal. Thus, the Mode S pulse indications provide a measure of the valid Mode S decodes of signals received by the receiver (e.g., receiver 202 in the case of IFF interrogator system 102 or receiver 302 in the case of IFF transponder system 108) of the IFF system. Mode S pulse counter 412 is also configured to provide the current counter value (i.e., Mode S pulse rate for the current integration period) to pulse jam accumulator 414 in response to receiving a reset signal from integration rate counter 402, and to reset itself (e.g., initialize the count to 0) subsequent to providing the current counter value to pulse jam accumulator 414. Resetting in this manner allows Mode S pulse counter 412 to determine the Mode S pulse rate for the subsequent integration period.

Pulse jam accumulator 414 is configured to determine a jamming pulse rate for the current integration period in response to receiving an integration period completion signal from integration rate counter 402. The jamming pulse rate is a measure of the number of jamming pulses that are entering the IFF system per integration period. In one embodiment, pulse jam accumulator 414 determines the jamming pulse rate by subtracting (discounting) from the overall pulse rate the real pulse rate. Note that the real pulse rate is the total of the SIF pulse rate, Mode 4 pulse rate, the Mode 5 pulse rate, and the Mode S pulse rate. In one specific embodiment, the overall pulse rate is input or otherwise provided by pulse counter 404, the SIF pulse rate is input or otherwise provided by SIF pulse counter 406, the Mode 4 pulse rate is input or otherwise provided by Mode 4 pulse counter 408, the Mode 5 pulse rate is input or otherwise provided by Mode 5 pulse counter 410, and the Mode S pulse rate is input or otherwise provided by Mode S pulse counter 412. In other embodiments, pulse jam accumulator 414 can retrieve the overall pulse rate, the SIF pulse rate, the Mode 4 pulse rate, the Mode 5 pulse rate, and the Mode S pulse rate in response to receiving the integration period completion signal from integration rate counter 402. In any such cases, pulse jam accumulator 414 provides the computed jamming pulse rate to threshold comparator 416.

According to some embodiments, jam pulse accumulator 414 includes an adder component and a register component. The overall pulse rate, negative SIF pulse rate, negative Mode 4 pulse rate, negative Mode 5 pulse rate, and negative Mode S pulse rate may each be supplied to the adder element such that the components of the real pulse rate are subtracted from the overall pulse rate. The resulting jamming pulse rate may be fed to the register for storage until it is passed on to threshold comparator 416 based on the state of the integration period completion signal from integration rate counter 402.

Threshold comparator 416 is configured to compare the jamming pulse rate against a pre-established jamming pulse rate threshold. The jamming pulse rate threshold is an expected limit on the number of jamming pulses that can be expected in the IFF system. As explained above, the jamming pulses are pulses that are not from valid decodes of signals received by the IFF system. In some embodiments, the jamming pulse rate threshold may be set based on, for example, the characteristics of the IFF system. To provide an illustrative example, an IFF transponder system on a long-range surveillance aircraft would expect to see a relatively larger number of jamming pulses whereas an IFF transponder system on a short-range aircraft (e.g., a fighter aircraft) would expect to see a relatively smaller number of jamming pulses. Thus, an IFF transponder system on a long-range aircraft may operate with a jamming pulse rate threshold set to a relatively large value, and an IFF transponder system on a short-range aircraft may operate with a jamming pulse rate threshold set to a relatively small value. To provide another illustrative example, for a ground-based IFF interrogator system, the jamming pulse rate threshold may be set based on characteristics such as the type of expected traffic pattern and/or volume of air traffic in the vicinity of the IFF interrogator system, to provide two examples. For instance, during periods of high traffic pattern, the ground-based IFF interrogator system may operate with a jamming pulse rate threshold set to a relatively large value during periods of high expected traffic pattern and/or volume. In comparison, the jamming pulse rate threshold in such ground-based IFF interrogator systems can be set to a relatively small value during periods of low expected traffic pattern and/or volume. In some embodiments, the jamming pulse rate threshold may be tunable based on a desired performance. For example, in one specific embodiment, the jamming pulse rate threshold may be controlled by software. In any such cases, a jamming pulse rate that exceeds the jamming pulse rate threshold may be indicative that a pulse jam is present in the IFF system.

Incremental accumulator 418 is used to maintain a running total or count of the number of integration periods in which a pulse jam is present and the number of integration periods in which a pulse jam is not present. In particular, and in one implementation, threshold comparator 416 increments by one (+1) incremental accumulator 418 if the jamming pulse rate (i.e., the count of the number of jamming pulses that entered the IFF system during the particular integration period) exceeds the jamming pulse rate threshold, decrements by one (−1) incremental accumulator 418 if the jamming pulse rate does not exceed the jamming pulse rate threshold, or does not change incremental accumulator 418 if the jamming pulse rate is equal to the jamming pulse rate threshold. In this manner, the value of incremental accumulator 418 reflects an average jamming pulse rate (e.g., average rate of the jamming pulses) that is updated at the integration rate. According to some embodiments, incremental accumulator 418 includes a register for storing the number of integration periods in which a pulse jam is present. This stored data can then be passed on to pulse jam determinator 420 based on the state of the integration period completion signal from integration rate counter 402.

Pulse jam determinator 420 is configured to determine whether there is (or is not) a pulse jam in the IFF system in response to receiving the integrated pulse jam data from incremental accumulator 418. In one embodiment, pulse jam determinator 420 determines the presence of a pulse jam by comparing the value of incremental accumulator 418 to a pre-established pulse jam threshold. The pulse jam threshold is a limit on the value of incremental accumulator 418 that needs to be exceeded before it can be concluded that a pulse jam is present in the IFF system. For example, the pulse jam threshold can be set to a relatively large value to specify a higher tolerance to jamming pulses and, conversely, set to a relatively small value to specify a lower tolerance to jamming pulses.

The pulse jam threshold may be adaptable and dynamic based on the traffic in a particular area, or based on the detection range of a system and the average number of replies or interrogations expected. According to an embodiment, a total number of pulses received may be averaged across integration periods, and percentages of the average total number of pulses may be used to determine a "high" and/or "low" threshold value. For example, a "low" value might be 10% of this average and a "high" value might be 20%. The total pulse counts over integration periods may be stored in memory and accessible via firmware or software to dynamically adjust the pulse jam threshold. In another embodiment, an estimate is made for the number of pulses to expect over an integration period, and percentages of the estimated number of pulses may be used to determine a "high" and/or "low" threshold value. For example, if 100 replies are expected in an integration period of 10 milliseconds, and each reply has an average of 8 pulses, then 800 real pulses are expected to be received in the period. In this case, a low pulse jam threshold value might be 80 (800 times 10%) and a high pulse jam threshold value might be 160 (800 times 20%).

As explained previously, incremental accumulator 418 maintains a count of the number of integration periods in which a pulse jam is present discounted by the number of integration periods in which a pulse jam is not present before it can be concluded that a pulse jam is present in the IFF system. If the value of incremental accumulator 418 exceeds the pulse jam threshold, pulse jam determinator 420 can conclude that a pulse jam is present in the IFF system. In this manner, a determination as to the presence of a pulse jam in the IFF system can be based on the average rate of the jamming pulses. In some embodiments, the pulse jam threshold may be tunable based on a desired performance. For example, in one specific embodiment, the pulse jam threshold may be controlled by software.

In some embodiments, pulse jam determinator 420 can generate or otherwise provide a pulse jam indication signal in response to concluding that a pulse jam is present in the IFF system. In some such embodiments, the generated pulse jam indication signal can be used to provide an indication of a pulse jam to an operator of the IFF system. For example, the indication provided to the operator may be a visual indication, an auditory indication, a haptic indication, or a combination thereof. Additionally or alternatively, the generated pulse jam indication signal can be used to raise the threshold of the receiver in the IFF system. Raising the threshold effectively desensitizes the receiver such that the rate of pulses entering the IFF system is reduced, allowing the stronger signals to be processed. These stronger signals are typically from targets that are closer in range to the IFF system. Note, however, that the receiver is not unnecessarily desensitized as a result of the effective reduction in false pulse jam indications.

Methodology

Figure 5:
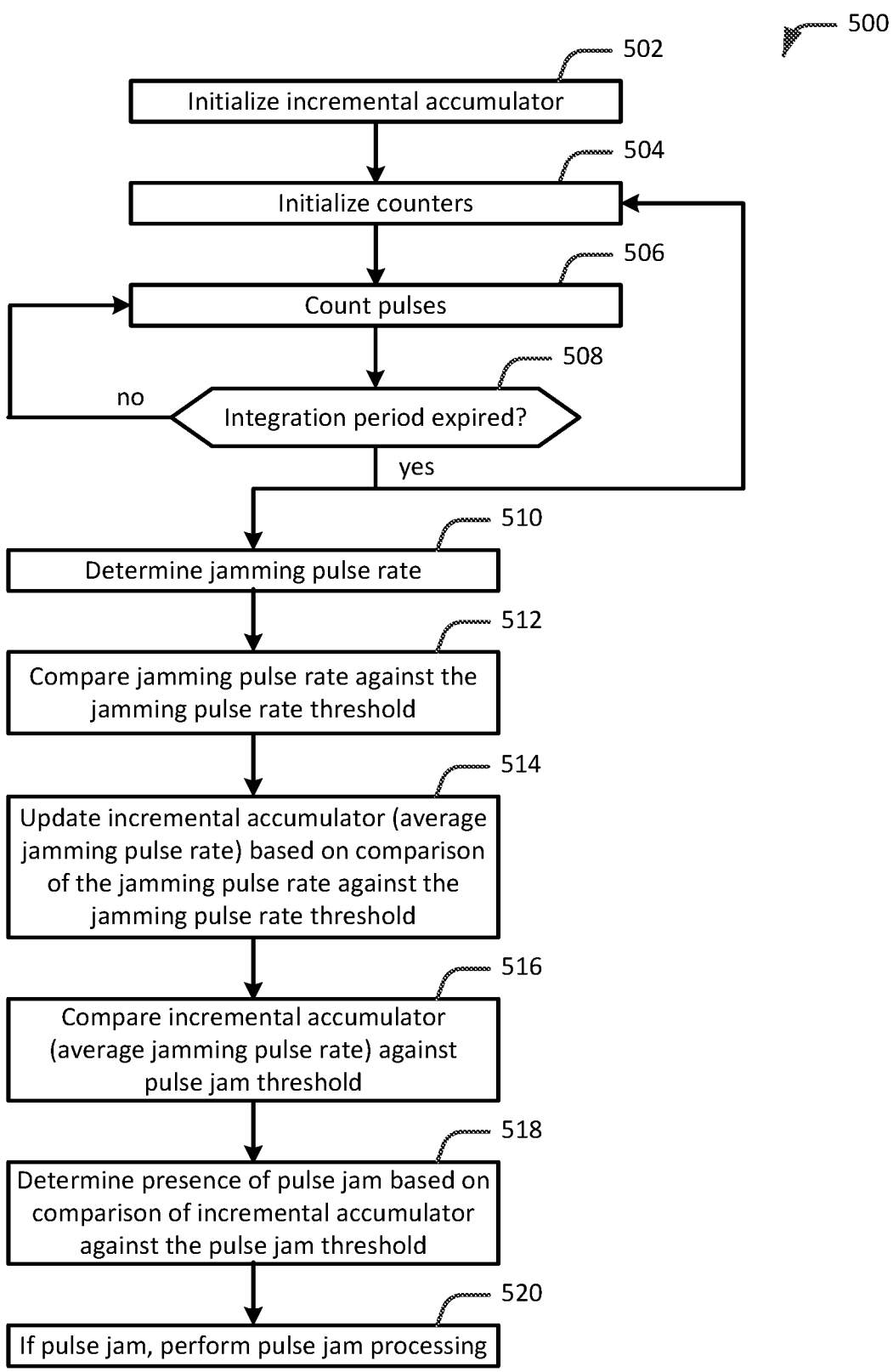
FIG. 5 is a flow diagram illustrating an example process for determining the presence of a pulse jam in an IFF system, in accordance with an embodiment of the present disclosure.

FIG. 5 is a flow diagram illustrating an example process 500 for determining the presence of a pulse jam in an IFF system, in accordance with an embodiment of the present disclosure. The operations, functions, or actions illustrated in example process 500 may in some embodiments be performed by IFF interrogator system 102 or IFF transponder system 108 and, more particularly, pulse jam detection circuit 208 of IFF interrogator system 102 or pulse jam detection circuit 208 of IFF transponder system 108. The operations, functions, or actions described in the respective blocks of example process 500 may also be stored as computer-executable instructions in a non-transitory computer-readable medium, such as a memory and/or a data storage of a computing system. In some instances, process 500 may be performed by components of pulse jam detection circuit 208.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments. To this end, each of the example processes depicted is provided to give one example embodiment and is not intended to limit the process to any particular physical or structural configuration.

With reference to example process 500, at operation 502, an incremental accumulator is initialized. For example, the incremental accumulator is initialized to a value of zero (0). The incremental accumulator is used to maintain a running total or count of the number of integration periods in which a pulse jam is present in the IFF system and the number of integration periods in which a pulse jam is not present in the IFF system (an average jamming pulse rate in the IFF system).

At operation 504, the counters used to determine the overall pulse rate and the real pulse rate are each initialized to zero (0). Depending on the capabilities of the IFF system, the counters may include a pulse counter for determining the overall pulse rate, a SIF pulse counter for determining the SIF pulse rate, a Mode 4 counter for determining the Mode 4 pulse rate, a Mode 5 pulse counter for determining the Mode 5 pulse rate, and a Mode S counter for determining the Mode S pulse rate. For example, the counters can be initialized at the start of an integration period to determine the overall pulse rate and the real pulse rate for the current integration period.

At operation 506, the pulses of the signals received by the IFF system are counted for the current integration period. For example, the counters can start counting the respective pulses received by the IFF system. At operation 508, a check is made to determine whether the current integration period has expired (e.g., whether the end of the current integration period is reached). If the current integration period has not expired, at operation 508, the counters continue to count the respective pulses received by the IFF system.

Otherwise, if the current integration period has expired, at operation 504, the counters are initialized to zero (0). This prepares the counters for determining the overall pulse rate and the real pulse rate for the subsequent integration period (the integration period following the just completed current integration period), and may be iterated any number of times (e.g., over a plurality of integration periods). Note, however, that the values of the counters (the counts of the various pulses received by the IFF system during the current integration period) are provided or otherwise retrieved for further processing prior to initialization of the counters.

Concurrent with the determination of the expiration of the current integration period, at operation 510, the jamming pulse rate for the current integration period is determined. For example, the jamming pulse rate can be determined by subtracting (discounting) from the overall pulse rate the real pulse rate.

At operation 512, the jamming pulse rate is compared against a jamming pulse rate threshold. At operation 514, the incremental accumulator (the average jamming pulse rate) is updated based on the results of the comparison of the jamming pulse rate to the jamming pulse rate threshold. For example, in one implementation, the incremental accumulator is incremented by one (+1) if the jamming pulse rate exceeds the jamming pulse rate threshold, decremented by one (−1) if the jamming pulse rate does not exceed the jamming pulse rate threshold, or remains unchanged (+0) if the jamming pulse rate is equal to the jamming pulse rate threshold.

At operation 516, the value of the incremental accumulator (the average jamming pulse rate) is compared against a pulse jam threshold. At operation 518, a determination is made as to the presence of a pulse jam in the IFF system based on the results of the comparison of the incremental accumulator value (the average jamming pulse rate) to the pulse jam threshold. For example, it can be concluded that a pulse jam is present in the IFF system if the incremental accumulator value exceeds the pulse jam threshold.

At operation 520, if a pulse jam is present in the IFF system, further pulse jam processing may be performed. For example, in one implementation, further pulse jam processing may include providing an indication of the pulse jam to an operator of the IFF system and/or raising the threshold of the IFF system receiver.

In some embodiments, additional operations are performed. For example, in one embodiment, the jamming pulse rate threshold can be tuned or adjusted in real-time based on the operating characteristics of the IFF system. For example, software can be implemented to monitor operating characteristics such as the number of jamming pulses entering the IFF system and/or the overall load on the IFF system, and dynamically tune or adjust the jamming pulse rate threshold accordingly. In another embodiment, the pulse jam threshold can be tuned or adjusted in real-time based on the operating characteristics of the IFF system. For example, software can be implemented to monitor operating characteristics such as the number of pulses entering the IFF system and/or the number of false pulse jam indications that are being generated, and dynamically tune or adjust the pulse jam threshold accordingly.

System Architecture

Figure 6:
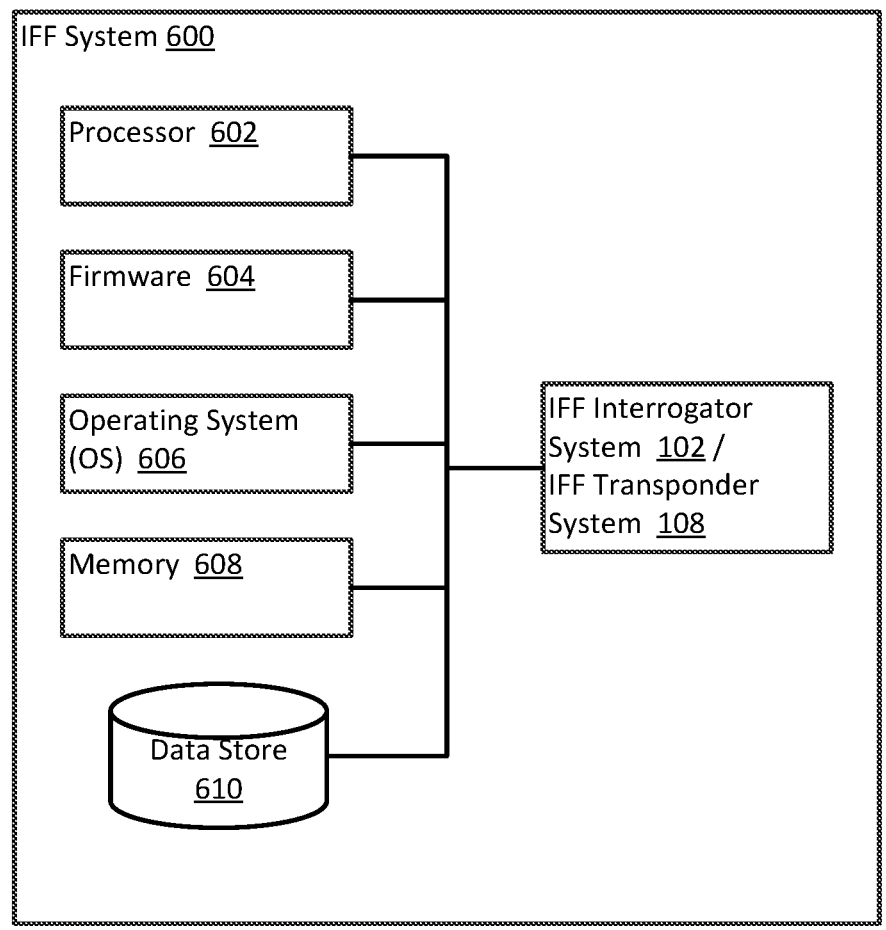
FIG. 6 is a block diagram illustrating selected components of an example IFF system comprising an IFF interrogator system and/or an IFF transponder system, in accordance with an embodiment of the present disclosure.

FIG. 6 is a block diagram illustrating selected components of an example IFF system 600 comprising IFF interrogator system 102 and/or IFF transponder system 108 and selected supporting components, in accordance with an embodiment of the present disclosure. As shown in FIG. 6, IFF system 600 includes a processor 602, a firmware 604, an operating system (OS) 606, a memory 608, a data store 610, and IFF interrogator system 102 and/or IFF transponder system 108. In various embodiments, additional components (not illustrated, such as a display, communication interface, input/output interface, etc.) or a subset of the illustrated components can be employed without deviating from the scope of the present disclosure.

Processor 602 can be any suitable processor, and may include one or more coprocessors or controllers, such as an audio processor, a graphics processing unit, or hardware accelerator, to assist in control and processing operations associated with IFF system 600. In some embodiments, processor 602 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 602 may be implemented as a complex instruction set computer (CISC) or a reduced instruction set computer (RISC) processor.

Memory 608 can be implemented using any suitable type of digital storage including, for example, flash memory and/or random access memory (RAM). In some embodiments, memory 608 may include various layers of memory hierarchy and/or memory caches as are known to those of skill in the art. Memory 608 may be implemented as a volatile memory device such as, but not limited to, a RAM, dynamic RAM (DRAM), or static RAM (SRAM) device. Data store 610 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, and/or a battery backed-up synchronous DRAM (SDRAM). In some embodiments, data store 610 may comprise technology to increase the storage performance enhanced protection for valuable digital media when multiple hard drives are included.

Processor 602 may be configured to execute OS 606 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with IFF system 600, and therefore may also be implemented using any suitable existing or subsequently-developed platform. Processor 602 may be configured to execute firmware 604.

It will be appreciated that in some embodiments, the various components of IFF system 600 may be combined or integrated in a system-on-a-chip (SoC) architecture. In some embodiments, the components may be hardware components, firmware components, software components or any suitable combination of hardware, firmware or software.

IFF interrogator system 102 is configured to transmit and receive IFF messages and radar pulses and determine the presence of pulse jams as previously described. IFF transponder system 108 is configured to transmit and receive IFF messages and radar pulses and determine the presence of pulse jams as previously described. IFF interrogator system 102 may include any or all of the circuits/components illustrated in FIGS. 2 and 4, as described above. IFF transponder system 108 may include any or all of the circuits/components illustrated in FIGS. 3 and 4, as described above. These components can be implemented or otherwise used in conjunction with a variety of suitable software and/or hardware that is coupled to or that otherwise forms a part of IFF system 600.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

FURTHER EXAMPLE EMBODIMENTS

The following examples pertain to further embodiments, from which numerous permutations and configurations will be apparent.

Example 1 is a computer program product including one or more non-transitory machine-readable mediums encoding instructions that when executed by one or more processors cause a process to be carried out for determining a presence of a pulse jam in an identification friend or foe (IFF) system, the process comprising: determining a plurality of jamming pulse rates for a plurality of corresponding integration periods, each of the plurality of jamming pulse rates being a count of jamming pulses associated with non-valid signals entering the IFF system over the corresponding integration period; computing an average jamming pulse rate from the plurality of jamming pulse rates; comparing the average jamming pulse rate to a pulse jam threshold; and in response to a determination that the average jamming pulse rate exceeds the pulse jam threshold, concluding that a pulse jam is present in the IFF system, wherein each of the integration periods are based on an integration rate such that each of the integration periods is a reciprocal of the integration rate.

Example 2 includes the subject matter of Example 1, wherein each of the jamming pulse rates is computed from an overall pulse rate and a real pulse rate for the corresponding integration period, the overall pulse rate being a count of the overall number of pulses associated with all signals entering the IFF system over the corresponding integration period, the real pulse rate being a count of the real pulses associated with valid signals entering the IFF system over the corresponding integration period.

Example 3 includes the subject matter of Example 1 or 2, wherein each of the integration periods has an equal duration of time.

Example 4 includes the subject matter of any one of Examples 1-3, wherein at least two of the integration periods have different durations of time.

Example 5 includes the subject matter of any one of Examples 1-4, wherein the integration rate is dynamically tuned.

Example 6 includes the subject matter of any one of Examples 1-5, wherein the IFF system is an IFF interrogator system, and the integration rate is based on a pulse repetition interval (PRI) to reach a maximum range.

Example 7 includes the subject matter of any one of Examples 1-5, wherein the IFF system is an IFF interrogator system, and the integration rate is based on a beam width of an antenna.

Example 8 includes the subject matter of any one of Examples 1-7, wherein the IFF system is an IFF interrogator system, and the integration rate is 40 milliseconds (ms).

Example 9 includes the subject matter of any one of Examples 1-5, wherein the IFF system is an IFF transponder system, and the integration rate is based on a receive range of the IFF transponder system.

Example 10 includes the subject matter of any one of Examples 1-5, wherein the IFF system is an IFF transponder system, and the integration rate is 10 ms.

Example 11 includes the subject matter of any one of Examples 1-10, wherein the pulse jam threshold is dynamically tuned based on a number of pulses entering the IFF system and/or a number of generated false pulse jam indications.

Example 12 includes the subject matter of any one of Examples 1-11, wherein computing the average jamming pulse rate comprises comparing each of the plurality of jamming pulse rates to a jamming pulse rate threshold, and updating an incremental accumulator based on the results of the comparisons.

Example 13 includes the subject matter of Example 12, wherein the jamming pulse rate threshold is dynamically tuned based on a number of jamming pulses entering the IFF system and/or an overall load on the IFF system.

Example 14 is a system configured to determine a presence of a pulse jam in an identification friend or foe (IFF) system, the system comprising: one or more non-transitory machine-readable mediums configured to store instructions; and one or more processors configured to execute the instructions stored on the one or more non-transitory machine-readable mediums, wherein execution of the instructions causes the one or more processors to determine a plurality of jamming pulse rates for a plurality of corresponding integration periods, each of the plurality of jamming pulse rates being a count of jamming pulses associated with non-valid signals entering the IFF system over the corresponding integration period; compute an average jamming pulse rate from the plurality of jamming pulse rates; and determine that a pulse jam is present in the IFF system in response to a determination that the average jamming pulse rate exceeds a pulse jam threshold; wherein each of the integration periods is based on an integration rate such that each of the integration periods is a reciprocal of the integration rate.

Example 15 includes the subject matter of Example 14, wherein the IFF system is one of an IFF interrogator system or an IFF transponder system.

Example 16 includes the subject matter of Example 14 or 15, wherein each of the jamming pulse rates is computed from an overall pulse rate and a real pulse rate for the corresponding integration period, the overall pulse rate being a count of the overall number of pulses associated with all signals entering the IFF system over the corresponding integration period, the real pulse rate being a count of the real pulses associated with valid signals entering the IFF system over the corresponding integration period.

Example 17 includes the subject matter of any one of Examples 14-16, wherein each of the integration periods has an equal duration of time.

Example 18 includes the subject matter of any one of Examples 14-16, wherein at least two of the integration periods have different durations of time.

Example 19 includes the subject matter of any one of Examples 14-18, wherein the integration rate is software controlled.

Example 20 includes the subject matter of any one of Examples 14-19, wherein the IFF system is an IFF interrogator system, and the integration rate is based on a pulse repetition interval (PRI) to reach a maximum range.

Example 21 includes the subject matter of any one of Examples 14-19, wherein the IFF system is an IFF interrogator system, and the integration rate is based on a beam width of an antenna.

Example 22 includes the subject matter of any one of Examples 14-21, wherein the IFF system is an IFF interrogator system, and the integration rate is 30 ms, 35 ms, 40 ms, 45 ms, or 50 ms.

Example 23 includes the subject matter of any one of Examples 14-19, wherein the IFF system is an IFF transponder system, and the integration rate is based on a receive range of the IFF transponder system.

Example 24 includes the subject matter of any one of Examples 14-19, wherein the IFF system is an IFF transponder system, and the integration rate is 7 ms, 8 ms, 9 ms, 10 ms, 11 ms, 12 ms, or 13 ms.

Example 25 includes the subject matter of any one of Examples 14-24, wherein the pulse jam threshold is software controlled based on a number of pulses entering the IFF system and/or a number of generated false pulse jam indications.

Example 26 includes the subject matter of any one of Examples 14-25, wherein to compute the average jamming pulse rate comprises comparing each of the plurality of jamming pulse rates to a jamming pulse rate threshold, and updating an incremental accumulator based on the results of the comparisons.

Example 27 includes the subject matter of Example 26, wherein the jamming pulse rate threshold is software controlled based on a number of jamming pulses entering the IFF system and/or an overall load on the IFF system.

Example 28 is a processor-implemented method for determining a presence of a pulse jam in an identification friend or foe (IFF) system, the method comprising: determining a plurality of jamming pulse rates for a plurality of corresponding integration periods, each of the plurality of jamming pulse rates being a count of jamming pulses associated with non-valid signals entering the IFF system over the corresponding integration period; computing an average jamming pulse rate from the plurality of jamming pulse rates; comparing the average jamming pulse rate to a pulse jam threshold; and in response to a determination that the average jamming pulse rate exceeds the pulse jam threshold, concluding that a pulse jam is present in the IFF system, wherein each of the integration periods is based on an integration rate such that each of the integration periods is a reciprocal of the integration rate.

Example 29 includes the subject matter of claim 28, wherein each of the jamming pulse rates is computed from an overall pulse rate and a real pulse rate for the corresponding integration period, the overall pulse rate being a count of the overall number of pulses associated with all signals entering the IFF system over the corresponding integration period, the real pulse rate being a count of the real pulses associated with valid signals entering the IFF system over the corresponding integration period.

Example 30 includes the subject matter of claim 28 or 29, wherein each of the integration periods has an equal duration of time.

Example 31 includes the subject matter of claim 28 or 29, wherein at least two of the integration periods have different durations of time.

Example 32 includes the subject matter of any one of claims 28-31, wherein the integration rate is dynamically tuned.

Example 33 includes the subject matter of any one of Examples 28-32, wherein the IFF system is an IFF interrogator system, and the integration rate is based on a pulse repetition interval (PRI) to reach a maximum range.

Example 34 includes the subject matter of any one of Examples 28-32, wherein the IFF system is an IFF interrogator system, and the integration rate is based on a beam width of an antenna.

Example 35 includes the subject matter of any one of Examples 28-34, wherein the IFF system is an IFF interrogator system, and the integration rate is 40 milliseconds (ms).

Example 36 includes the subject matter of any one of Examples 28-32, wherein the IFF system is an IFF transponder system, and the integration rate is based on a receive range of the IFF transponder system.

Example 37 includes the subject matter of any one of Examples 28-32, wherein the IFF system is an IFF transponder system, and the integration rate is 10 ms.

Example 38 includes the subject matter of any one of Examples 28-37, wherein the pulse jam threshold is dynamically tuned based on a number of pulses entering the IFF system and/or a number of generated false pulse jam indications.

Example 39 includes the subject matter of any one of Examples 28-38, wherein computing the average jamming pulse rate comprises comparing each of the plurality of jamming pulse rates to a jamming pulse rate threshold, and updating an incremental accumulator based on the results of the comparisons.

Example 40 includes the subject matter of Example 39, wherein the jamming pulse rate threshold is dynamically tuned based on a number of jamming pulses entering the IFF system and/or an overall load on the IFF system.

As used in the present disclosure, the terms "circuit" or "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer program product including one or more non-transitory machine-readable mediums encoding instructions that when executed by one or more processors cause a process to be carried out for determining a pulse jam in an identification friend or foe (IFF) system, the process comprising:
   determining a plurality of jamming pulse rates for a plurality of corresponding integration periods, each of the plurality of jamming pulse rates being a count of jamming pulses associated with non-valid signals entering the IFF system over the corresponding integration period, wherein the non-valid signals include pulses designed to jam or pulses that are not part of a valid decode format;
   computing an average jamming pulse rate from the plurality of jamming pulse rates;
   comparing the average jamming pulse rate to a pulse jam threshold; and
   in response to a determination that the average jamming pulse rate exceeds the pulse jam threshold, concluding that the pulse jam is present in the IFF system,
   wherein each of the corresponding integration periods are based on an integration rate such that each of the corresponding integration periods is a reciprocal of the integration rate.

2. The computer program product of claim 1, wherein:
   each of the jamming pulse rates is computed from an overall pulse rate and a real pulse rate for the corresponding integration period, the overall pulse rate being a count of the overall number of pulses associated with all signals entering the IFF system over the corresponding integration period, the real pulse rate being a count of real pulses associated with valid signals entering the IFF system over the corresponding integration period.

3. The computer program product of claim 1, wherein each of the integration periods has an equal duration of time.

4. The computer program product of claim 1, wherein at least two of the integration periods have different durations of time.

5. The computer program product of claim 1, wherein the integration rate is dynamically tuned.

6. The computer program product of claim 1, wherein the IFF system is an IFF interrogator system, and the integration rate is based on a pulse repetition interval (PRI) to reach a maximum unambiguous range.

7. The computer program product of claim 1, wherein the IFF system is an IFF interrogator system, and the integration rate is based on a beam width of an antenna.

8. The computer program product of claim 1, wherein the IFF system is an IFF transponder system, and a receive range of the IFF transponder system affects the integration rate by impacting a number of interrogations the IFF transponder system expects to receive.

9. The computer program product of claim 1, wherein the pulse jam threshold is dynamically tuned based on a number of pulses entering the IFF system and/or a number of generated false pulse jam indications.

10. The computer program product of claim 1, wherein computing the average jamming pulse rate comprises comparing each of the plurality of jamming pulse rates to a jamming pulse rate threshold, and updating an incremental accumulator based on the results of the comparisons.

11. The computer program product of claim 10, wherein the jamming pulse rate threshold is dynamically tuned based on the count of jamming pulses entering the IFF system and/or an overload on the IFF system from receiving too many pulses.

12. A system configured to determine a pulse jam in an identification friend or foe (IFF) system, the system comprising:
   one or more non-transitory machine-readable mediums configured to store instructions; and
   one or more processors configured to execute the instructions stored on the one or more non-transitory machine-readable mediums, wherein execution of the instructions causes the one or more processors to
   determine a plurality of jamming pulse rates for a plurality of corresponding integration periods, each of the plurality of jamming pulse rates being a count of jamming pulses associated with non-valid signals entering the IFF system over the corresponding integration period, wherein the non-valid signals include pulses designed to jam or pulses that are not part of a valid decode format;
   compute an average jamming pulse rate from the plurality of jamming pulse rates; and
   determine that the pulse jam is present in the IFF system in response to a determination that the average jamming pulse rate exceeds a pulse jam threshold;
   wherein each of the corresponding integration periods is based on an integration rate such that each of the corresponding integration periods is a reciprocal of the integration rate and defines the duration of time over which the pulses are counted.

13. The system of claim 12, wherein the IFF system is one of an IFF interrogator system or an IFF transponder system.

14. The system of claim 12, wherein:
each of the jamming pulse rates is computed from an overall pulse rate and a real pulse rate for the corresponding integration period, the overall pulse rate being a count of the overall number of pulses associated with all signals entering the IFF system over the corresponding integration period, the real pulse rate being a count of the real pulses associated with valid signals entering the IFF system over the corresponding integration period.

15. The system of claim 12, wherein each of the integration periods has an equal duration of time.

16. The system of claim 12, wherein at least two of the integration periods have different durations of time.

17. The system of claim 12, wherein the IFF system is an IFF interrogator system, and the integration rate is based on a pulse repetition interval (PRI) to reach a maximum unambiguous range.

18. The system of claim 12, wherein the IFF system is an IFF interrogator system, and the integration rate is based on a beam width of an antenna.

19. The system of claim 12, wherein the IFF system is an IFF transponder system, and a receive range of the IFF transponder system affects the integration rate by impacting a number of interrogations the IFF transponder system expects to receive.

20. The system of claim 12, wherein the pulse jam threshold is software controlled based on a number of pulses entering the IFF system and/or a number of generated false pulse jam indications.

21. The system of claim 12, wherein to compute the average jamming pulse rate comprises comparing each of the plurality of jamming pulse rates to a jamming pulse rate threshold, and updating an incremental accumulator based on the results of the comparisons.

22. The system of claim 21, wherein the jamming pulse rate threshold is software controlled based on a number of jamming pulses entering the IFF system and/or an overload on the IFF system from receiving too many pulses.

23. A processor-implemented method for determining a pulse jam in an identification friend or foe (IFF) system, the method comprising:
determining a plurality of jamming pulse rates for a plurality of corresponding integration periods, each of the plurality of jamming pulse rates being a count of jamming pulses associated with non-valid signals entering the IFF system over the corresponding integration period, wherein the non-valid signals include pulses designed to jam or pulses that are not part of a valid decode format;
computing an average jamming pulse rate from the plurality of jamming pulse rates;
comparing the average jamming pulse rate to a pulse jam threshold; and
in response to a determination that the average jamming pulse rate exceeds the pulse jam threshold, concluding that the pulse jam is present in the IFF system,
wherein each of the corresponding integration periods is based on an integration rate such that each of the corresponding integration periods is a reciprocal of the integration rate.

24. The method of claim 23, wherein:
each of the jamming pulse rates is computed from an overall pulse rate and a real pulse rate for the corresponding integration period, the overall pulse rate being a count of the overall number of pulses associated with all signals entering the IFF system over the corresponding integration period, the real pulse rate being a count of the real pulses associated with valid signals entering the IFF system over the corresponding integration period.

25. The method of claim 23, wherein computing the average jamming pulse rate comprises comparing each of the plurality of jamming pulse rates to a jamming pulse rate threshold, and updating an incremental accumulator based on the results of the comparisons.

* * * * *